(12) United States Patent
Jeon

(10) Patent No.: US 12,442,209 B2
(45) Date of Patent: Oct. 14, 2025

(54) SAFETY SMART SHELTER FOR DISASTER EVACUATION

(71) Applicant: DWELLING CO., LTD, Seoul (KR)

(72) Inventor: Jeong Hwan Jeon, Seoul (KR)

(73) Assignee: DWELLING CO., LTD, Seoul (KR)

( * ) Notice: Subject to any disclaimer, the term of this patent is extended or adjusted under 35 U.S.C. 154(b) by 444 days.

(21) Appl. No.: 18/019,829

(22) PCT Filed: Aug. 4, 2021

(86) PCT No.: PCT/KR2021/010200
§ 371 (c)(1),
(2) Date: Feb. 27, 2023

(87) PCT Pub. No.: WO2022/030983
PCT Pub. Date: Feb. 10, 2022

(65) Prior Publication Data
US 2023/0295942 A1    Sep. 21, 2023

(30) Foreign Application Priority Data
Aug. 6, 2020   (KR) ........................ 10-2020-0098516

(51) Int. Cl.
*E04H 1/12*       (2006.01)
*A61H 3/06*       (2006.01)
(Continued)

(52) U.S. Cl.
CPC .......... *E04H 1/1205* (2013.01); *A61H 3/066* (2013.01); *A47C 7/74* (2013.01); *F21S 8/04* (2013.01); *G09F 9/30* (2013.01); *H02S 10/00* (2013.01)

(58) Field of Classification Search
CPC ....... E04H 1/0205; E04H 1/1211; E04H 9/14; E04H 9/16; A61H 3/066; A61H 3/061;
(Continued)

(56) References Cited

U.S. PATENT DOCUMENTS 4,018,016 A * 4/1977 Zale ...................... E04H 1/1211
                                                              52/656.1
D250,837 S * 1/1979 Lahaie ............................ D25/1
(Continued)

FOREIGN PATENT DOCUMENTS

CN    111927160 A * 11/2020 ................ E04B 1/58
CN    112211439 A *  1/2021 ........... E04H 1/1205
(Continued)

OTHER PUBLICATIONS

International Search Report for PCT/KR2021/010200 mailed Nov. 3, 2021 from Korean Intellectual Property Office.
(Continued)

*Primary Examiner* — Ryan D Kwiecinski
(74) *Attorney, Agent, or Firm* — Revolution IP, PLLC

(57) ABSTRACT

A disaster safety smart shelter is a shelter installed outdoors and includes: a shelter housing including a plurality of side wall parts, a ceiling part shielding upper portions of the plurality of side wall parts, a waiting space formed therein and an opening and shutting door which is formed through at least a portion of the side wall parts to allow access to the waiting space; a ventilation module including an air discharge port provided through the ceiling part to discharge air inside the waiting space to the outside and an air suction port for supplying air from the outside to the waiting space; an information guidance terminal module provided to the exposed to the inside of the waiting space and displaying a plurality of pieces of information to a user; and a power supply module provided on the ceiling part to supply power to each part.

14 Claims, 12 Drawing Sheets

(51) Int. Cl.
  *A47C 7/74* (2006.01)
  *F21S 8/04* (2006.01)
  *G09F 9/30* (2006.01)
  *H02S 10/00* (2014.01)

(58) Field of Classification Search
  CPC ... A47C 7/74; A47C 11/00; F21S 8/04; G09F 9/30; H02S 10/00; H02S 40/38; E06B 3/4636; E06B 3/6715; F24F 1/0047; F24F 3/16; F24F 7/013
  See application file for complete search history.

(56) References Cited

U.S. PATENT DOCUMENTS

| | | | | |
|---|---|---|---|---|
| 4,173,855 | A * | 11/1979 | Raptoplous | A47K 3/28 52/236.1 |
| 4,469,086 | A * | 9/1984 | Ivorra | F28D 20/0034 126/633 |
| D294,300 | S * | 2/1988 | Hoelterhoff | D25/1 |
| 5,107,637 | A * | 4/1992 | Robbins | F21S 9/032 40/442 |
| 5,363,608 | A * | 11/1994 | Conlan | E04H 1/1211 52/66 |
| 5,526,615 | A * | 6/1996 | Kaizu | G07F 19/205 49/40 |
| 5,649,395 | A * | 7/1997 | Durham | F24S 20/66 52/36.2 |
| D403,434 | S * | 12/1998 | Sander | D25/1 |
| 5,927,026 | A * | 7/1999 | Durham | F24S 60/00 52/173.3 |
| 6,085,475 | A * | 7/2000 | Parks | E04H 9/14 52/79.14 |
| D500,143 | S * | 12/2004 | Moncho | D25/56 |
| 7,237,360 | B2 * | 7/2007 | Moncho | G09F 13/04 52/36.2 |
| 8,272,175 | B1 * | 9/2012 | Williams-Prades | E04H 1/14 135/900 |
| 8,418,418 | B2 * | 4/2013 | Willham | H10F 19/80 52/173.3 |
| 9,121,168 | B2 * | 9/2015 | Levy | E04B 1/3483 |
| 9,276,412 | B2 * | 3/2016 | Omar | H02S 20/00 |
| 9,293,948 | B2 * | 3/2016 | Freitas | H02J 9/062 |
| 9,491,798 | B2 * | 11/2016 | Ngah | H04W 84/10 |
| 9,797,153 | B2 * | 10/2017 | Baggiero, II | E04H 9/16 |
| D822,849 | S * | 7/2018 | Levy | D25/33 |
| 10,536,026 | B2 * | 1/2020 | Gerhold | B60L 53/11 |
| 11,241,992 | B2 * | 2/2022 | Devine | B60P 3/32 |
| D970,751 | S * | 11/2022 | Matsuzaki | D25/33 |
| D971,439 | S * | 11/2022 | Fukasawa | D25/33 |
| 2004/0194401 | A1 * | 10/2004 | Smith | E04B 1/14 52/79.9 |
| 2004/0244402 | A1 * | 12/2004 | Yum | F24F 1/0067 62/411 |
| 2006/0055193 | A1 * | 3/2006 | Colborne | B60P 3/14 296/24.3 |
| 2012/0028560 | A1 * | 2/2012 | Nikolic | F24F 7/013 454/239 |
| 2013/0169047 | A1 * | 7/2013 | Omar | E04H 1/1211 307/11 |
| 2013/0213614 | A1 * | 8/2013 | Ikeda | F24F 1/0014 165/104.34 |
| 2014/0116870 | A1 * | 5/2014 | Kamen | E04H 3/02 202/83 |
| 2014/0230345 | A1 * | 8/2014 | Ibanez | E04H 9/14 52/79.1 |
| 2015/0252558 | A1 * | 9/2015 | Chin | E04H 9/02 52/745.03 |
| 2018/0361906 | A1 * | 12/2018 | Devine | H02S 10/40 |
| 2019/0010693 | A1 * | 1/2019 | Powers | E04H 15/001 |
| 2020/0018060 | A1 * | 1/2020 | Watanabe | E04B 1/34326 |
| 2020/0349870 | A1 * | 11/2020 | Fallon | G06F 1/181 |
| 2021/0188663 | A1 * | 6/2021 | Kamen | E04H 3/08 |
| 2021/0355699 | A1 * | 11/2021 | Righetto | A61B 5/6888 |
| 2022/0056717 | A1 * | 2/2022 | Quagliana Parker | E04B 1/34869 |
| 2022/0298786 | A1 * | 9/2022 | Koh | H02S 20/26 |
| 2022/0316724 | A1 * | 10/2022 | Matsuzaki | B01L 1/04 |
| 2022/0360210 | A1 * | 11/2022 | Lyford | H10F 77/488 |
| 2022/0385786 | A1 * | 12/2022 | Wee | E04H 9/145 |
| 2023/0240895 | A1 * | 8/2023 | Kim | A61H 3/066 607/54 |
| 2023/0295942 | A1 * | 9/2023 | Jeon | H02S 40/38 52/173.3 |
| 2024/0334903 | A1 * | 10/2024 | Armer | E04H 1/1205 |

FOREIGN PATENT DOCUMENTS

| | | | | |
|---|---|---|---|---|
| CN | 112245176 A | * | 1/2021 | A61G 10/005 |
| DE | 202014008739 U1 | * | 12/2014 | E04H 1/1205 |
| EP | 1707870 A1 | * | 10/2006 | F21V 23/0471 |
| EP | 2797065 A1 | * | 10/2014 | E04H 1/1211 |
| EP | 3124884 A1 | * | 2/2017 | F24F 12/006 |
| EP | 3574980 A1 | * | 12/2019 | B01D 46/30 |
| FR | 3044481 A1 | * | 6/2017 | B60L 53/35 |
| JP | 2014217068 A | * | 11/2014 | E04H 1/1211 |
| JP | 2019211204 A | * | 12/2019 | B01D 46/30 |
| KR | 20-0319423 Y1 | | 7/2003 | |
| KR | 1293326 B1 | * | 8/2013 | |
| KR | 10-2013-0119298 A | | 10/2013 | |
| KR | 2015071693 A | * | 6/2015 | |
| KR | 10-2015-0097934 A | | 8/2015 | |
| KR | 10-2016-0112386 A | | 9/2016 | |
| KR | 1863890 B1 | * | 3/2018 | |
| KR | 10-2052732 B1 | | 12/2019 | |
| KR | 2072157 B1 | * | 2/2020 | |
| KR | 2202502 B1 | * | 1/2021 | |
| KR | 2287876 B1 | * | 8/2021 | |
| KR | 2808397 B1 | * | 5/2025 | |
| WO | WO-2019226011 A1 | * | 11/2019 | H01F 27/30 |

OTHER PUBLICATIONS

Mong-Sil-E, "Take care of the Air Conditioner Outdoor Unit with a Protective Cover", Naver Blog, Retrieved on Sep. 13, 2021, Retrieved from <http://blog.naver.com/jounglove79/222005006570>.

* cited by examiner

FIG. 12
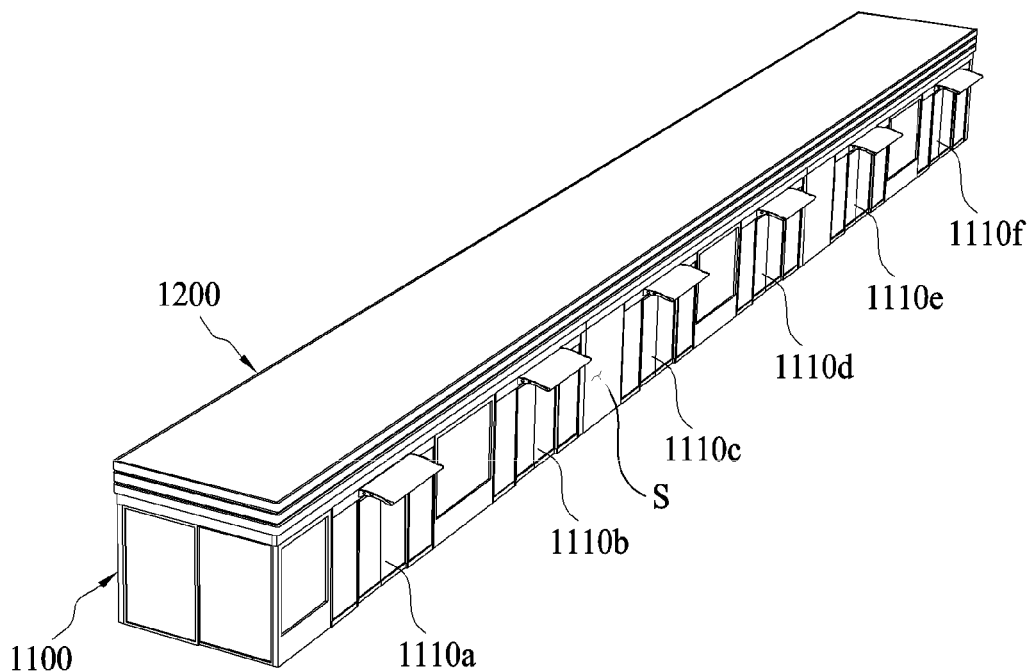
FIG. 13
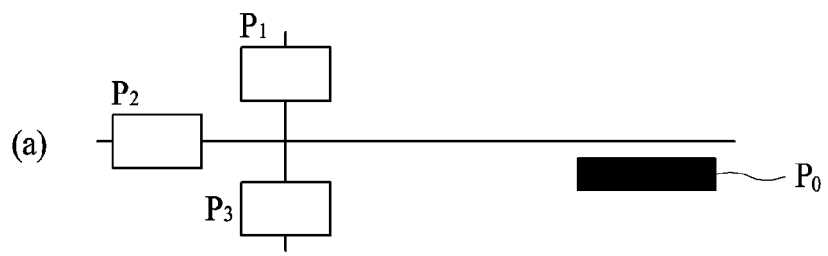
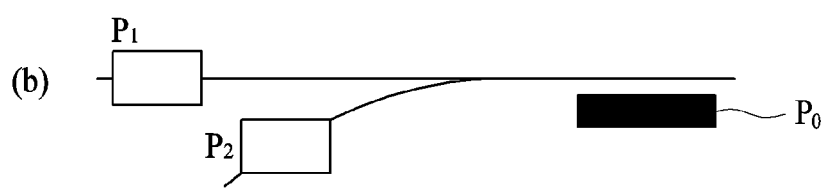

SAFETY SMART SHELTER FOR DISASTER EVACUATION

TECHNICAL FIELD

The present invention relates to a disaster safety smart shelter, and more particularly, to a disaster safety smart shelter installed outdoors to enable users to evacuate from various social and natural disasters and to provide complex functions for multi-purpose use.

BACKGROUND ART

In recent years, as interest in large and small social and natural disasters such as fine dust, heat waves, and cold waves have increased, it is urgent to prepare countermeasures for citizens' health and welfare. Therefore, various countermeasures are being sought for such social and natural disasters, but none of them have been effective so far.

In addition, in general, stops of public transportation for ground transportation such as buses, taxis, and ground railways may be often installed outdoors, and passengers using public transportation are directly exposed to such outdoor environments.

Therefore, passengers cannot help but suffer damage from various social and natural disasters as described above, and in the case of seasons such as summer or winter, passengers on standby have no choice but to endure heat or cold.

In addition, since people will stand by with an umbrella supported in case of rain or snowfall, a standby line is longer than usual, especially in the case of a bus stop with many passengers, and clothes, shoes, etc., are wet from moisture while standing by to cause discomfort.

Therefore, it is necessary to utilize structures that may provide various functions such as a standby station for public transportation while allowing citizens to evacuate from various social and natural disasters to protect their health.

DISCLOSURE

Technical Problem

The present invention is devised to solve the problems of the prior art described above, and an object of the present invention is to provide a disaster safety smart shelter installed outdoors to enable users to evacuate from various social and natural disasters and additionally provides various complex functions.

Problems of the present invention are not limited to the above-described problems. That is, other problems that are not described may be obviously understood by those skilled in the art from the following specification.

Technical Solution

To accomplish the above object, according to an embodiment of the present invention, there is provided a disaster safety smart shelter installed outdoor, including: a shelter housing including a plurality of side wall parts, a ceiling part shielding upper portions of the plurality of side wall parts, a waiting space formed therein, which a user enters and waits in, and an opening and shutting door which is formed through at least a portion of the side wall parts to allow access to the waiting space; a ventilation module including an air discharge port provided through the ceiling part to discharge air inside the waiting space to the outside and an air suction port for supplying air from the outside to the waiting space; an information guidance terminal module provided to the exposed to the inside of the waiting space and displaying a plurality of pieces of information to a user; and a power supply module provided on the ceiling part to supply power to each part.

In this case, the ventilation module may further include an air purifying device that is provided across an air discharge path connected from the waiting space to the air discharge port and an air suction path connected from the waiting space to the air suction to purify flowing air.

The disaster safety smart shelter may further include a cooling and heating module provided on the ceiling part to supply cool air or warm air to the waiting space.

In addition, the disaster safety smart shelter may further include a photovoltaic power generation module provided outside the ceiling part to generate power from sunlight, and the power supply module may include a power storage unit for storing power generated by the photovoltaic power generation module.

The disaster safety smart shelter may further include a lighting module provided on the ceiling part and radiating light to the waiting space and a dimming module detecting illuminance of the waiting space to adjust the illuminance of the lighting module.

The disaster safety smart shelter may further include a waiting seat provided in the waiting space and formed to allow the user to be seated and including a temperature control module formed to adjust a temperature of a seating surface on which a user's body is seated.

Meanwhile, the shelter housing may further include a bottom part shielding a lower portion of the plurality of side wall parts, and a sidewalk block for a blind person may be provided on the bottom part to form a preset guide path from the opening and shutting door to the inside of the waiting space.

The shelter housing may further include a window configured to have an arbitrary area and to have transparency, and a fixing frame provided to fix the window.

In this case, the window may be provided with a thermal barrier film.

Advantageous Effects

According to a disaster safety smart shelter of the present invention for solving the above problems, since a shelter housing has a waiting space shielded from the external environment, there is the advantage that users may enter the waiting space to evacuate various social and natural disasters, and comfortably wait through various additionally provided functions.

In addition, the present invention has the advantage of helping to improve a user's health by providing high-quality air through not only shielding harsh external environments but also purifying and controlling a temperature of air inside the waiting space.

In addition, the present invention has the advantage of being able to provide a variety of customized functions by interlocking with an external system.

The effects of the present invention are not limited to the above-described effects. That is, other effects that are not described may be obviously understood by those skilled in the art from the claims.

DESCRIPTION OF DRAWINGS

FIG. 12 is a diagram showing the overall appearance of a disaster safety smart shelter according to a fourth embodiment of the present invention.

FIG. 13 is a diagram showing a connection pattern of a stop for applying an operating algorithm in a state in which the disaster safety smart shelter according to the fourth embodiment of the present invention is installed at a public transportation stop.

BEST MODE

Figure 1:
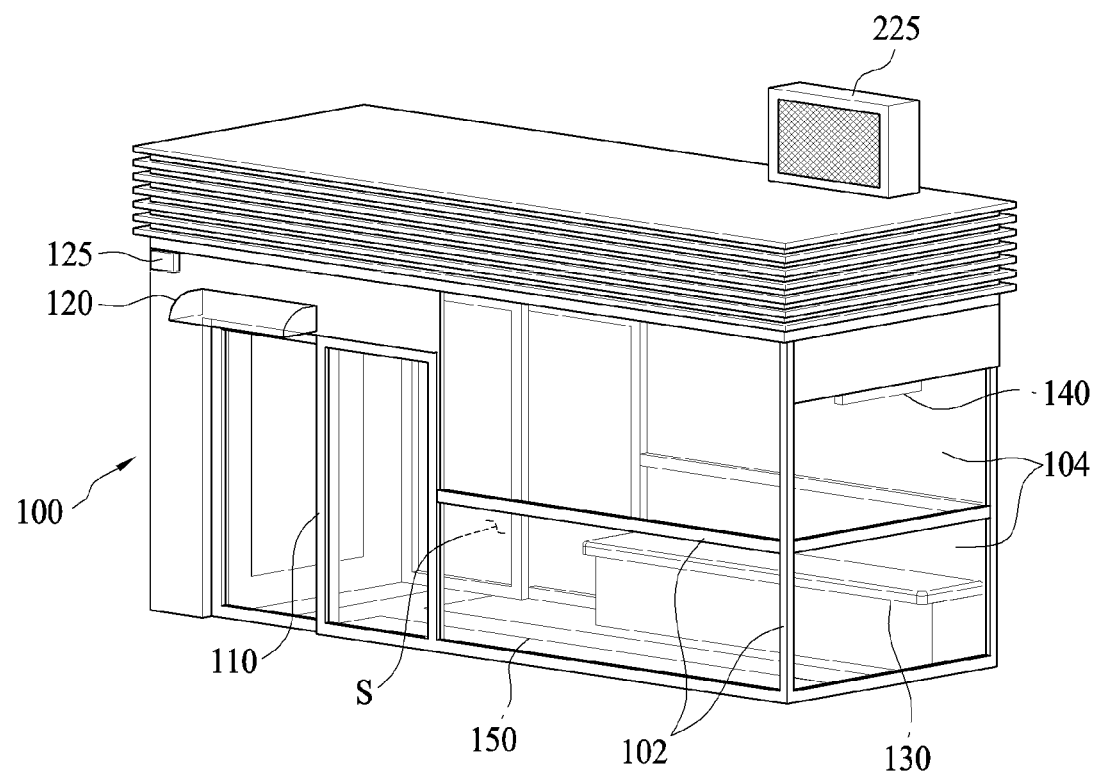
FIG. 1 is a diagram showing the overall appearance of a disaster safety smart shelter according to a first embodiment of the present invention.

Hereinafter, a preferred embodiment of the present invention in which the object of the present invention can be realized in detail will be described with reference to the accompanying drawings. In describing the present embodiment, the same name and the same reference numeral are used for the same configuration, and additional description thereof will be omitted.

Figure 2:
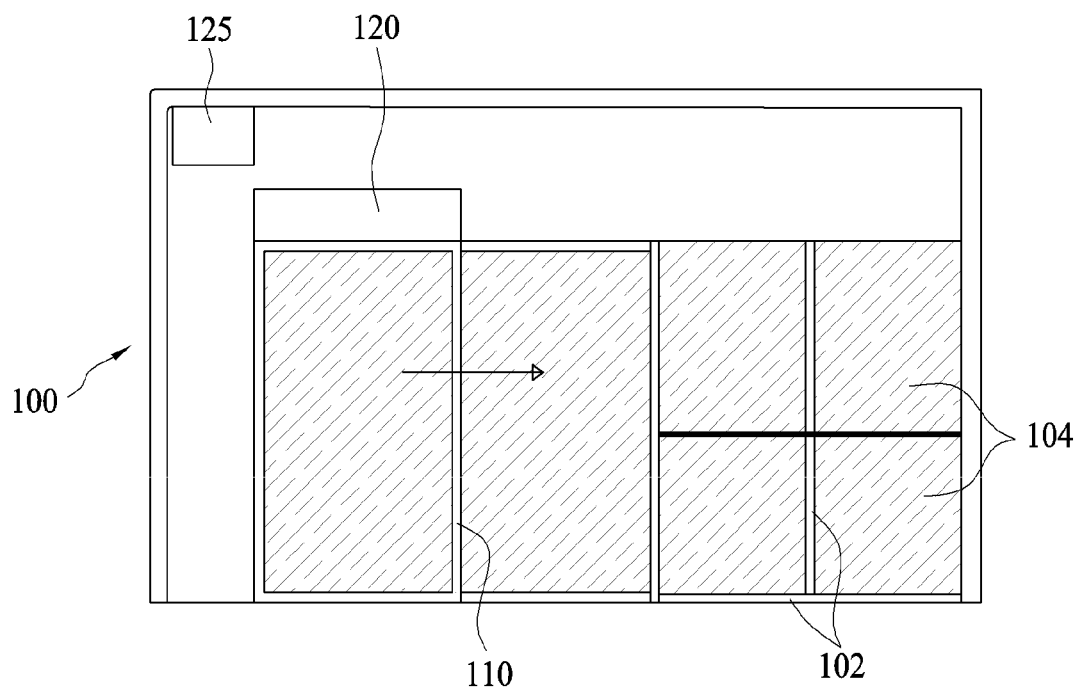
FIG. 2 is a diagram showing a front appearance of the disaster safety smart shelter according to the first embodiment of the present invention.

FIG. 1 is a diagram showing the overall appearance of a disaster safety smart shelter according to a first embodiment of the present invention, and FIG. 2 is a diagram showing a front appearance of the disaster safety smart shelter according to the first embodiment of the present invention.

Figure 3:
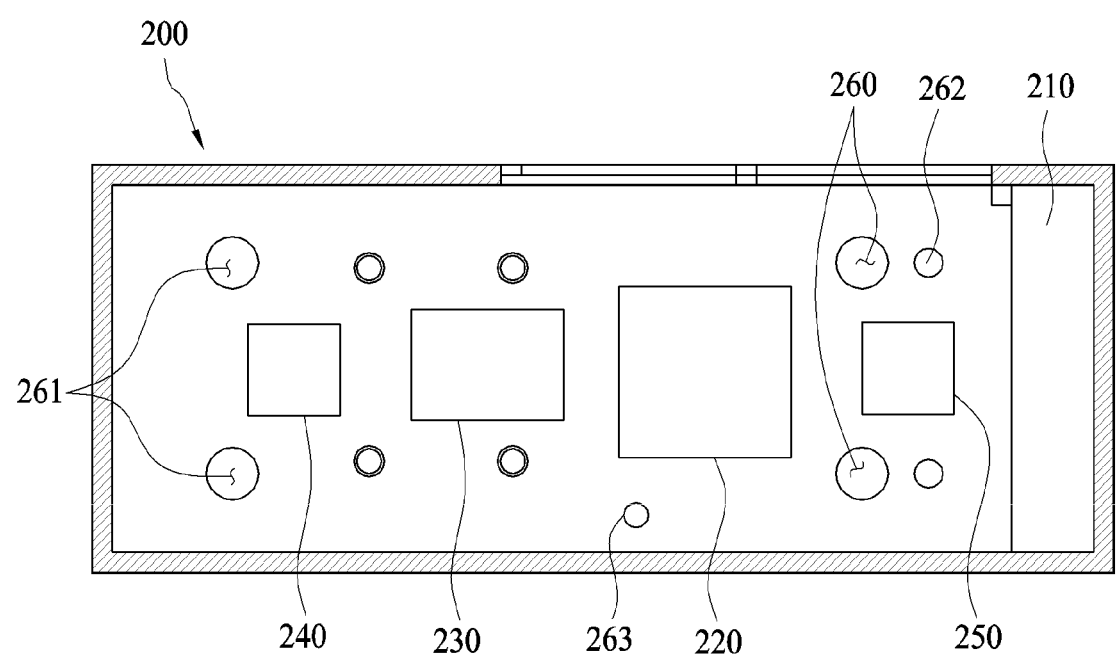
FIG. 3 is a diagram showing an internal structure of a ceiling part in the disaster safety smart shelter according to the first embodiment of the present invention.
Figure 4:
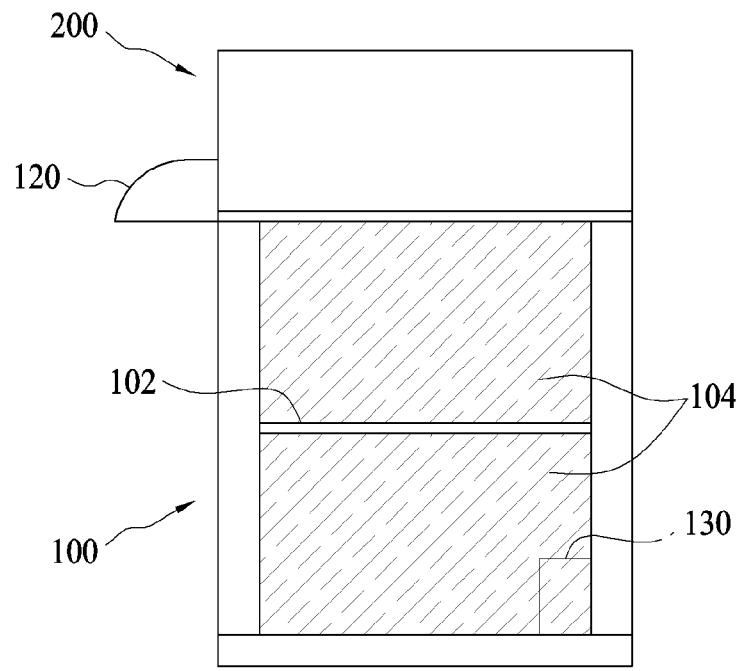
FIG. 4 is a diagram showing a right appearance of the disaster safety smart shelter according to the first embodiment of the present invention.
Figure 5:
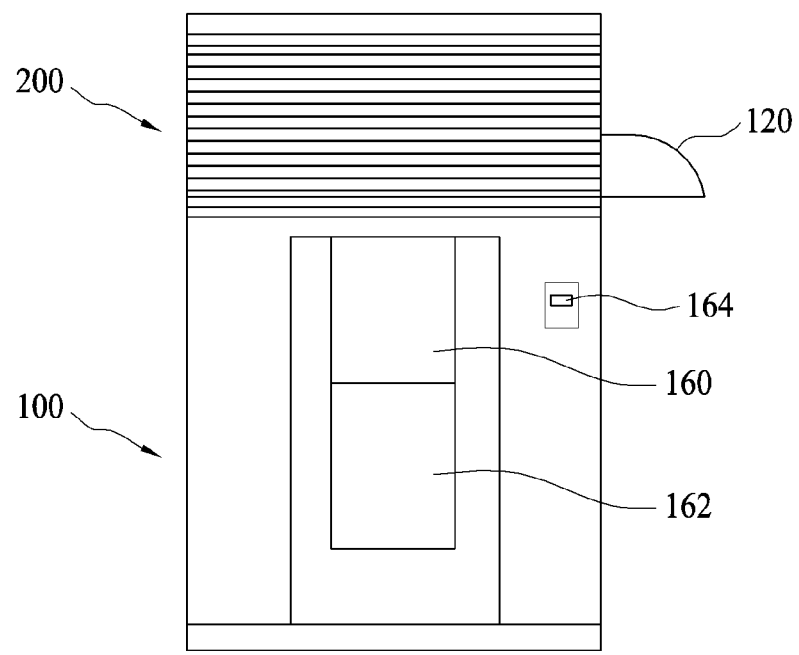
FIG. 5 is a diagram showing a left appearance of the disaster safety smart shelter according to the first embodiment of the present invention.

FIG. 3 is a diagram showing an internal structure of a ceiling part in the disaster safety smart shelter according to the first embodiment of the present invention, FIG. 4 is a diagram showing a right appearance of the disaster safety smart shelter according to the first embodiment of the present invention, and FIG. 5 is a diagram showing a left appearance of the disaster safety smart shelter according to the first embodiment of the present invention.

Figure 6:
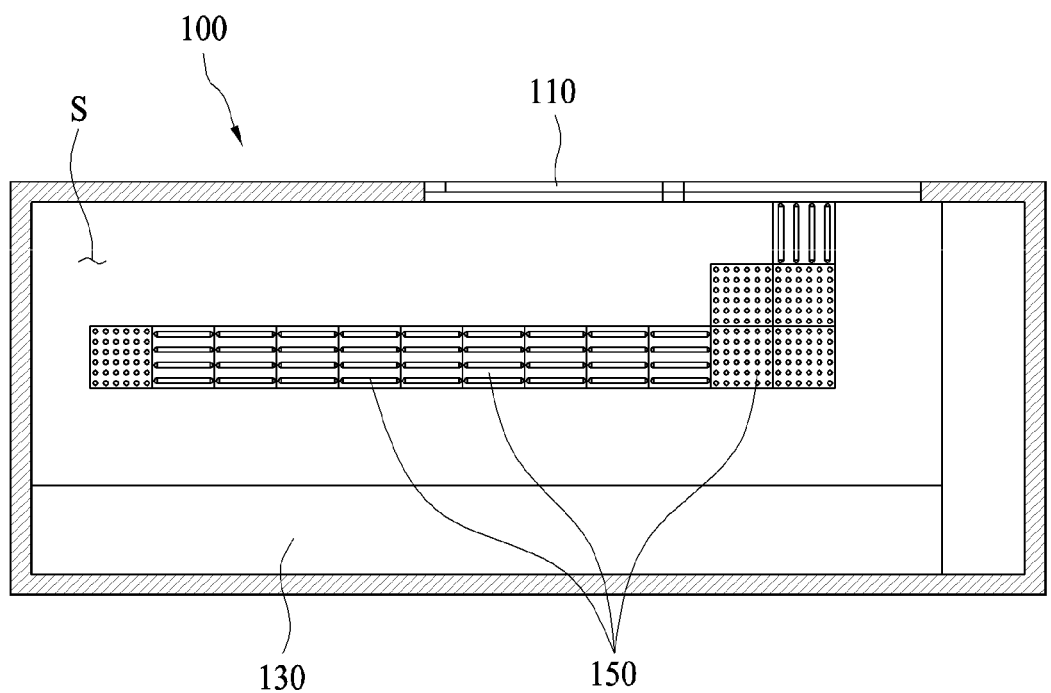
FIG. 6 is a diagram showing a structure of a bottom part in the disaster safety smart shelter according to the first embodiment of the present invention.

FIG. 6 is a diagram showing a structure of a bottom part in the disaster safety smart shelter according to the first embodiment of the present invention.

Referring to FIGS. 1 to 6, the disaster safety smart shelter 100 according to the present invention may be installed outdoors. In particular, it is exemplified that the disaster safety smart shelter 100 shown in the present embodiment to be described below is installed at a bus stop and performs a function of a shelter for public transportation along with a function of disaster avoidance, but this is limited only to the present embodiment, and may be applied not only to public transportation stops, but also to various standby stations and structures installed for special purposes.

In addition, the present invention has the advantage that users may conveniently and comfortably stand by through various additional functions operating based on Internet of Things (IoT) as well as a disaster avoidance function.

The disaster safety smart shelter according to the present embodiment includes a shelter housing 100 having a waiting space s formed therein, which a user enters and waits in.

The shelter housing 100 includes a plurality of side wall parts, a ceiling part 200 shielding upper portions of the plurality of side wall parts, and the waiting space S formed therein by the side wall parts and the ceiling part 200.

In addition, in the case of the present embodiment, the shelter housing 100 further includes a bottom part shielding lower portions of the plurality of side wall parts. However, it goes without saying that the side wall part of the shelter housing 100 may be directly installed on the ground in a form in which the bottom part is omitted.

In addition, an opening and shutting door 110 for entering and exiting the waiting space S may be formed on at least a portion of the side wall part.

In the present embodiment, the opening and shutting door 110 is formed in a form that is automatically opened and shut in a sliding manner on the front side wall part of each side wall part of the shelter housing 100, that is, the side wall part toward the road side, and the upper portion of the opening door 110 is provided with a canopy 120 for shielding light or preventing rainwater. Such an opening and shutting door 110 may also be replaced with various forms other than the present embodiment.

Meanwhile, the side wall part of the shelter housing 100 is formed to have an arbitrary area in the remaining region except for a region where the opening and shutting door 110 is located, and may include a window 104 formed to have transparency and a fixing frame 102 provided to fix the window. This is to allow a user located inside the waiting space S to visually confirm the outside.

In addition, the window 104 may be provided with a heat shielding film, a UV shielding film, and the like to minimize the influence of external high or low temperature on the waiting space S and to shield harmful rays of the sun.

In addition, in the present embodiment, the side wall of the shelter housing 100 toward the road may be provided with a logo attachment part 125 capable of attaching various display information such as a local government logo of the area where the disaster safety smart shelter is installed.

In addition, the side wall part located on the left side of the shelter housing 100 is formed in a frame shape with the window 104 omitted and shielded as a whole, and may include a communication box 160, a distribution box 162, and a meter 164. The reason for doing this is that a vehicle approaches from the right side when looking at the domestic standard shelter housing 100 from the front, and unlike Korea, in the case of a country where a vehicle comes from the opposite side, it goes without saying that the shelter housing 100 may be formed in an inverted form.

Meanwhile, in the disaster safety smart shelter of the above type, components providing various functions may be installed.

First, the disaster safety smart shelter of the present embodiment includes a ventilation module including an air discharge port 261 that is provided on the ceiling part 200 to discharge air in the waiting space S to the outside and supplies outside air to the waiting space S and an air suction port 260 that supplies cool air or warm air to the waiting space S, provided on the ceiling part 200, and a cooling and heating module 220 adjusting the temperature of the waiting space S.

In this case, the ventilation module further includes an air purifying device 230 that is provided across an air discharge path connected from the waiting space S to the air discharge port 261 and an air suction path connected from the waiting space S to the air suction 260 to purify flowing air, and the cooling and heating module 220 further includes an outdoor unit 225 provided outside the ceiling part 200.

Accordingly, the disaster safety smart shelter of the present embodiment may improve the air quality of the waiting space S and create a comfortable environment by controlling the temperature according to the outside temperature.

In addition, the present embodiment may include at least one or more of a fine dust meter that measures fine dust in the waiting space S and a temperature detector that detects the temperature of the waiting space S, and an external management system may receive measured values of the fine dust meter and the temperature detector to remotely appropriately control the purifying device 230 or the cooling and heating module 220.

In addition, the disaster safety smart shelter of the present embodiment includes a lighting module 262 that is provided on the ceiling part 200 and radiates light to the waiting space S, a dimming module 263 that detects illuminance of the waiting space S and adjusts the illuminance of the lighting module 262, and a power supply module 210 that is provided on the ceiling part 200 to supply power to each part.

In addition, the disaster safety smart shelter of the present embodiment further includes a photovoltaic power generation module 250 that is provided outside the ceiling part 200 to generate power from sunlight, and in this case, the power supply module 210 may include a power storage unit that stores power generated by the photovoltaic power generation module 250.

That is, since the power supply module 210 can supply auxiliary power through the photovoltaic power generation module 250, it is possible to further increase power efficiency.

In addition, inspection holes 240 for maintaining/repairing each component provided in the ceiling part 200 may be additionally formed in the ceiling part 200 as described above.

Meanwhile, the disaster safety smart shelter of the present embodiment includes an information guidance terminal module 140 that is provided to be exposed to the inside of the waiting space S and displays a plurality of pieces of information to a user, and a waiting seat 130 that is provided in the waiting space S and formed to allow the user to be seated.

The information guidance terminal module 140 may provide various types of information such as various environmental information such as air quality and temperature in the waiting space S, and air quality and temperature outside in addition to public transportation information including public transportation routes, arrival times, dispatch intervals, etc.

In addition, the waiting seat 130 may further include a temperature control module capable of adjusting the temperature of the seating surface on which the user's body is seated. Accordingly, the temperature control module may operate during the winter season, etc., to comfortably maintain the temperature of the seating surface of the waiting seat 130.

In addition, as described above, the shelter housing 100 of the present embodiment further includes a bottom part shielding lower portions of the plurality of side wall parts. In this case, as the sidewalk block 150 for a blind person is provided on the bottom part to form a preset guide path from the opening and shutting door 110 to the inside of the waiting space S, the blind person may conveniently use the disaster safety smart shelter of the present invention.

As described above, according to the first embodiment of the present invention, since the shelter housing 100 has the waiting space S shielded from the external environment, a user using public transportation may comfortably wait through various functions provided by entering the waiting space S while waiting for public transportation, and provide high-quality air through purification and temperature control of the air inside the waiting space S as well as shielding the harsh external environment, thereby helping improve user's health.

Figure 7:
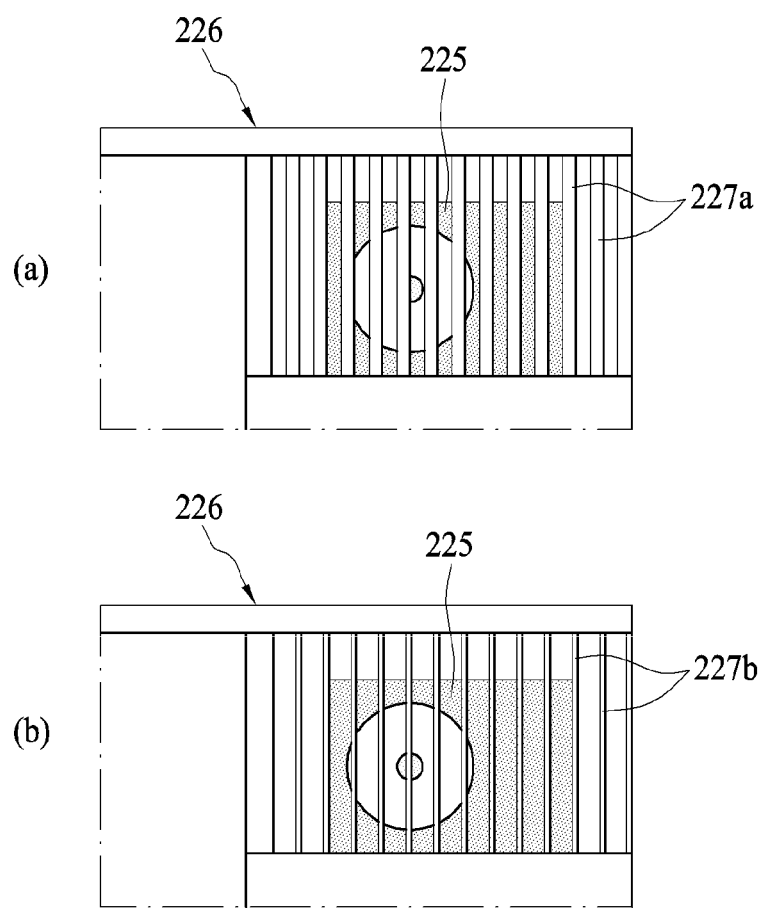
FIG. 7 is a diagram showing various forms of an outdoor unit case surrounding an outdoor unit of a cooling and heating module in the disaster safety smart shelter according to the first embodiment of the present invention.
Figure 8:
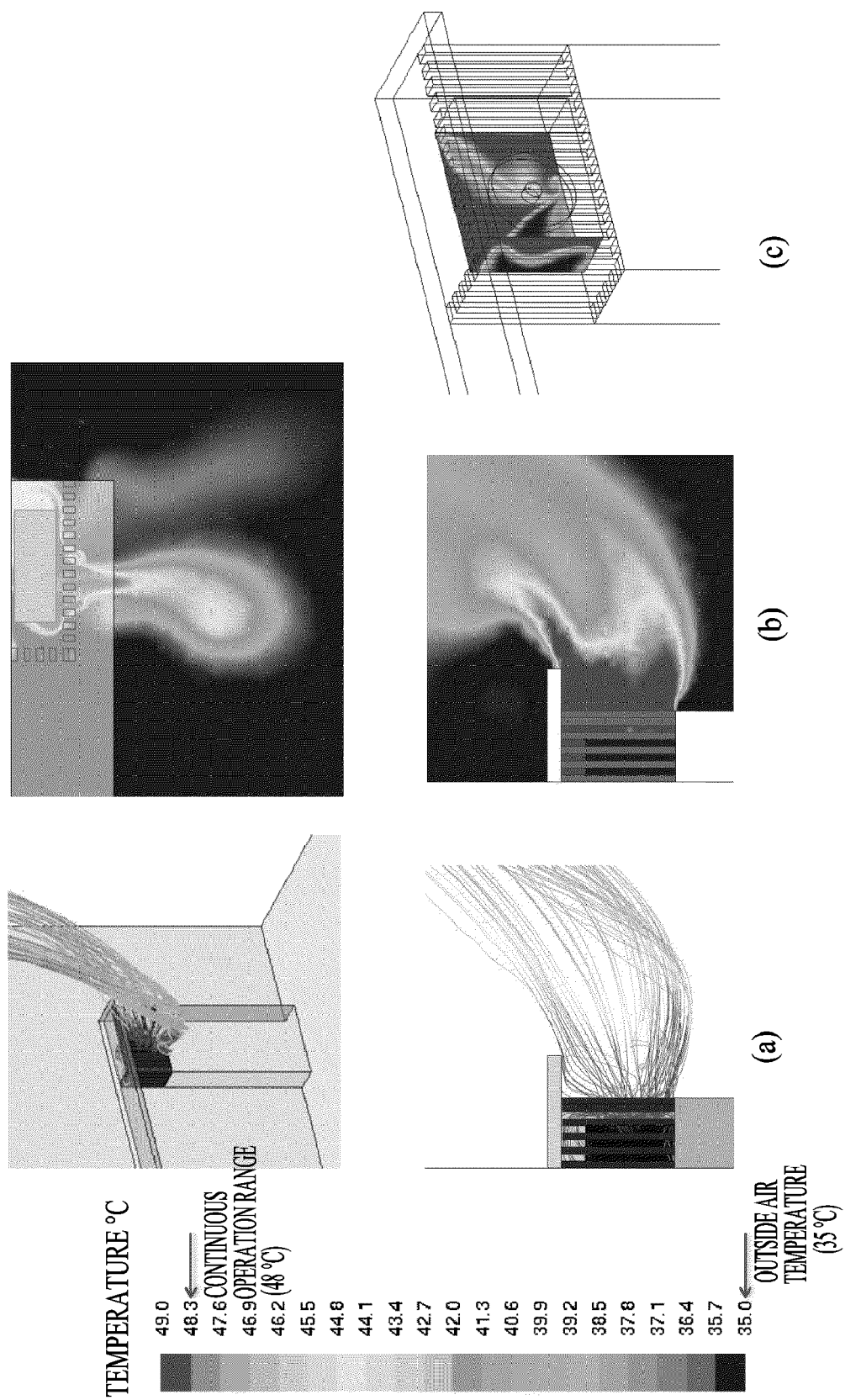
FIG. 8 is a diagram showing air flow and temperature analysis for an outdoor unit case having an aperture ratio of 50% in the disaster safety smart shelter according to the first embodiment of the present invention.
Figure 9:
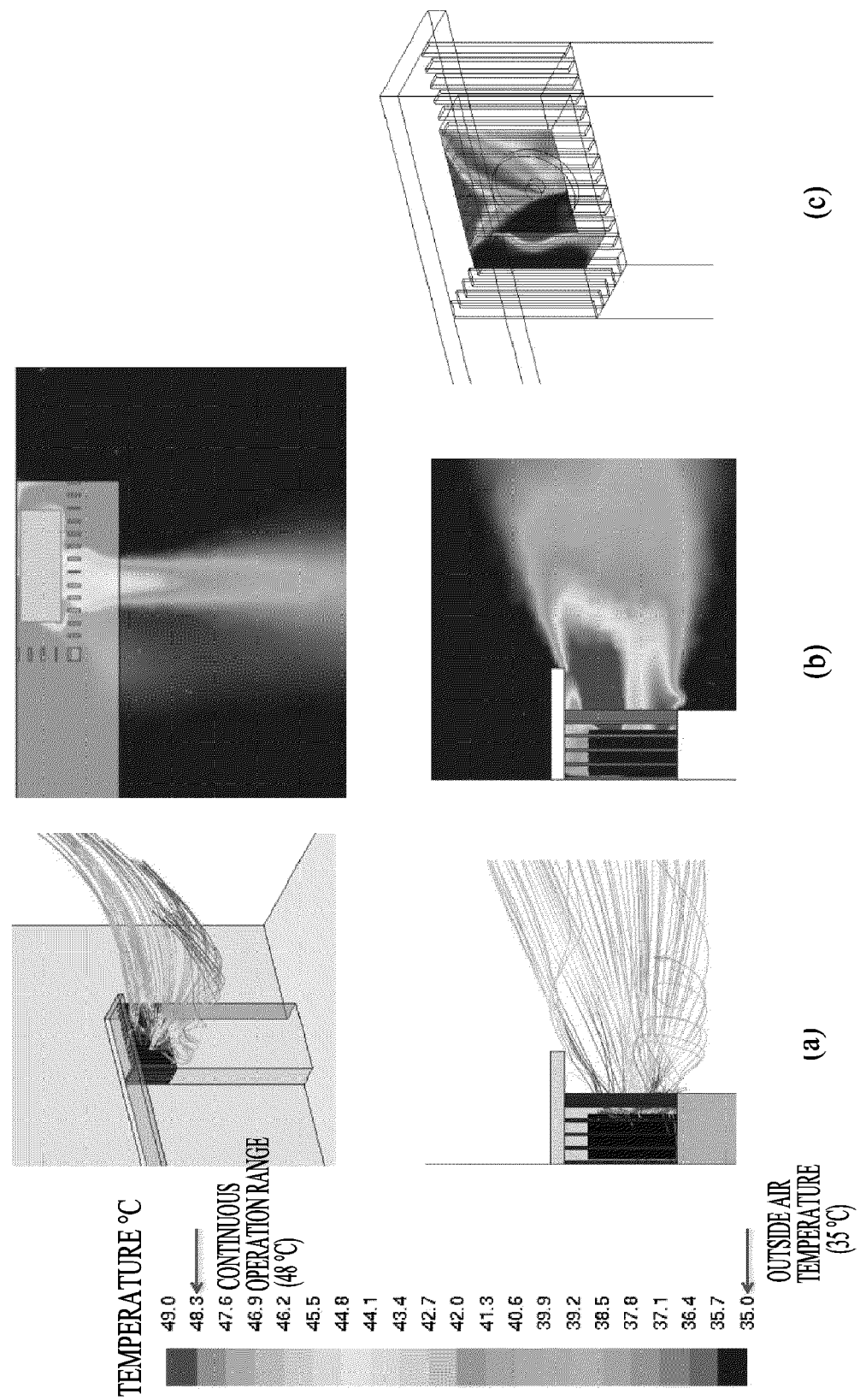
FIG. 9 is a diagram showing air flow and temperature analysis for an outdoor unit case having an aperture ratio of 80% in the disaster safety smart shelter according to the first embodiment of the present invention.

Meanwhile, in the case of the present invention, as shown in FIGS. 7 to 9, an outdoor unit case 226 surrounding the outdoor unit 225 of the cooling and heating module 220 may be further provided.

FIG. 7 is a diagram showing various forms of the outdoor unit case 226 surrounding the outdoor unit 225 of the cooling/heating module 220 in the disaster safety smart shelter according to the first embodiment of the present invention.

As shown in FIG. 7, the outdoor unit case 226 has the outdoor unit 225 accommodated therein, and may include a plurality of frame bars 227a and 227b forming openings therebetween to discharge air.

In this case, the outdoor unit case 226 shown in FIG. 7A, which is one type, has a frame bar 227a thicker than a thickness of a frame bar 227b of the outdoor unit case 226 shown in FIG. 7B which is another type, so the aperture ratio of the outdoor unit case 226 of FIG. 7B is higher than that of the outdoor unit case 226 of FIG. 7A.

In the present embodiment, the aperture ratio of the outdoor unit case 226 shown in FIG. 7A is 50%, and the aperture ratio of the outdoor unit case shown in FIG. 7B is 80%.

FIG. 8 is a diagram showing air flow and temperature analysis for an outdoor unit case having an aperture ratio of 50% in the disaster safety smart shelter according to the first embodiment of the present invention. FIG. 9 is a diagram showing air flow and temperature analysis for an outdoor unit case having an aperture ratio of 80% in the disaster safety smart shelter according to the first embodiment of the present invention.

In each of FIGS. 8 and 9, (a) shows the pattern analysis of the air flow discharged from the outdoor unit 225, (b) shows the distribution of the cross-sectional temperature, and (c) shows the temperature of the air flowing into the heat exchanger.

As shown in the above analysis results, in the case of an outdoor unit case having aperture ratio of 50%, a highest temperature of the inflowing air to the heat exchanger is expected to be reduced to 46.1° C. compared to the rated capacity, and in the case of an outdoor unit case having an aperture ratio of 80%, the highest temperature of the air flowing into the heat exchanger is expected to be 40.3° C., enabling smooth operation.

Therefore, according to the analysis result, it can be seen that it is desirable to maintain the aperture ratio of the outdoor unit case at 80% or more.

Hereinafter, other embodiments of the present invention will be described.

Figure 10:
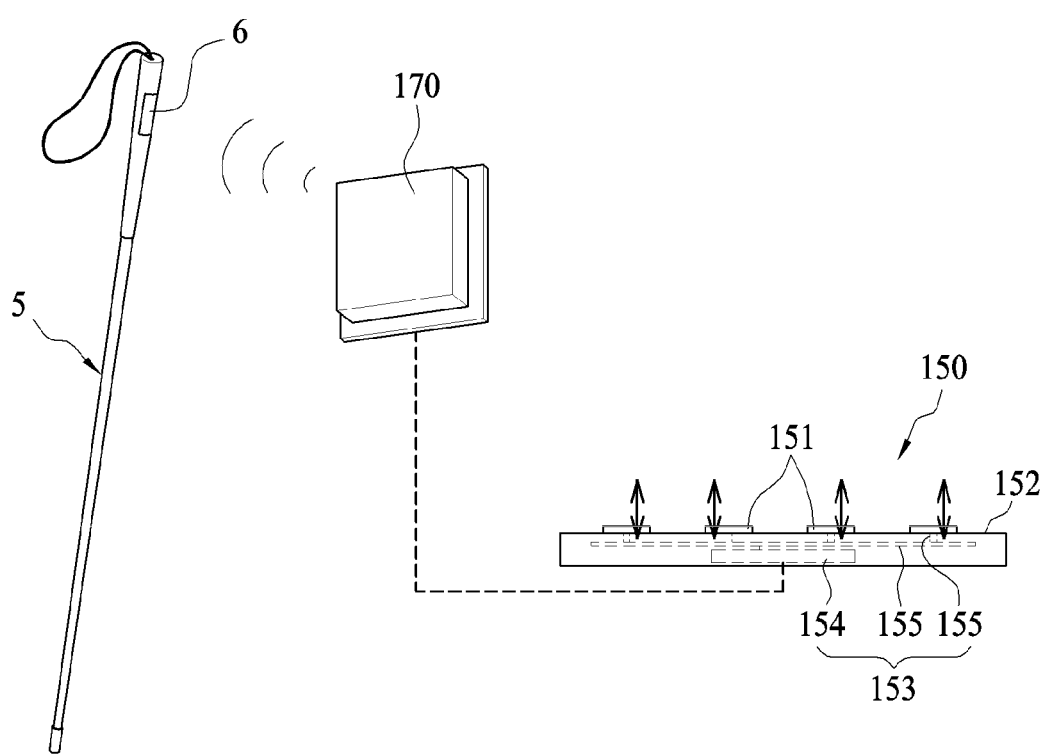
FIG. 10 is a diagram showing a structure of a sidewalk block for a blind person and an operating process of a system interlocking therewith in a disaster safety smart shelter according to a second embodiment of the present invention.

FIG. 10 is a diagram showing a structure of the sidewalk block 150 for a blind person and an operating process of a system interlocking therewith in a disaster safety smart shelter according to a second embodiment of the present invention.

In the case of the second embodiment of the present invention shown in FIG. 10, as in the first embodiment described above, the shelter housing 100 includes the bottom part, and the sidewalk block 150 for a blind person is installed on the bottom part.

In this case, in the present embodiment, the sidewalk block 150 for a blind person includes a block part 152 that is buried in the bottom part and a protruding guide part 151 that protrudes upward from the block part 152 and performs guidance through tactile sense to the blind person, and is configured to move the protruding guide part in a vertical direction to adjust a height from an upper surface of the block part.

Specifically, the sidewalk block 150 for a blind person further includes an up and down stroke unit 155 having a preset area and performing up and down strokes inside the block part by the driving motor 154, and a height control module 153 including a connecting part 155 extending upward from the up and down stroke part 155 and connecting each protruding guide part 151 so that the protruding guide part 151 moves up and down according to the up and down stroke of the up and down stroke part 155.

Therefore, in the present embodiment, when the protruding guide part 151 is maximally downward by the height control module 153, a height of an upper surface of the protruding guide part 151 may match the height of the upper surface of the block part 152 to realize a flat upper surface, and when the protruding guide part 151 move up by the height control module 153, the protruding guide part 151 may be formed to protrude upward from the block portion 152 to perform an original guide function for a blind person.

Meanwhile, the disaster safety smart shelter of the present embodiment may further include a detection module 170 on the premise that the sensed means 6 is provided in a cane 5 for a blind person possessed by the blind person, along with the sidewalk block 150 for a blind person.

The detection module 170 is for detecting the sensed means 6. For example, the sensed means 6 and the detection module 170 may be known various mutual recognition such as RFID and RFID detector. It goes without saying that the detection method of the sensed means 6 and the detection module 170 may be applied in various ways without limitation.

Also, the height control module 153 interlocks with the detection module 170 so that the protruding guide part 151 may maintain a downward state to the maximum in a state in which the detection module 170 does not detect the sensed means 6, and the protruding guide part 151 may maintain an upward state in a state in which the detection module 170 detects the sensed means 6.

That is, when the detection module 170 detects the sensed means 6, it may be recognized as a situation in which the blind person enters the waiting space S, and in this case, the protruding guide part 151 maintains an upward state, so the sidewalk block 150 for a blind person performs its original function.

in a state in which the detection module 170 does not detect the sensed means 6, it may be recognized that there is no a blind person in the waiting space S, and in this case, the protruding guide part 151 maintains the downward state, it is possible to prevent the non-blind person from being caught on the protruding guide part 151 while using the waiting space S.

In addition, since the sidewalk block 150 for the blind person may be provided to form a preset guide path from the opening and shutting door 110 to the inside of the waiting space S, the detection module 170 may detect a distance from the sensed means 6 to specify the position of the blind person, and to drive only the height control module 153 of the plurality of sidewalk blocks 150 for the blind person adjacent to the position of the blind person upwardly.

In addition, the height control module 153 of each sidewalk block 150 for the blind person may be controlled in real time according to the movement of the blind person.

Figure 11:
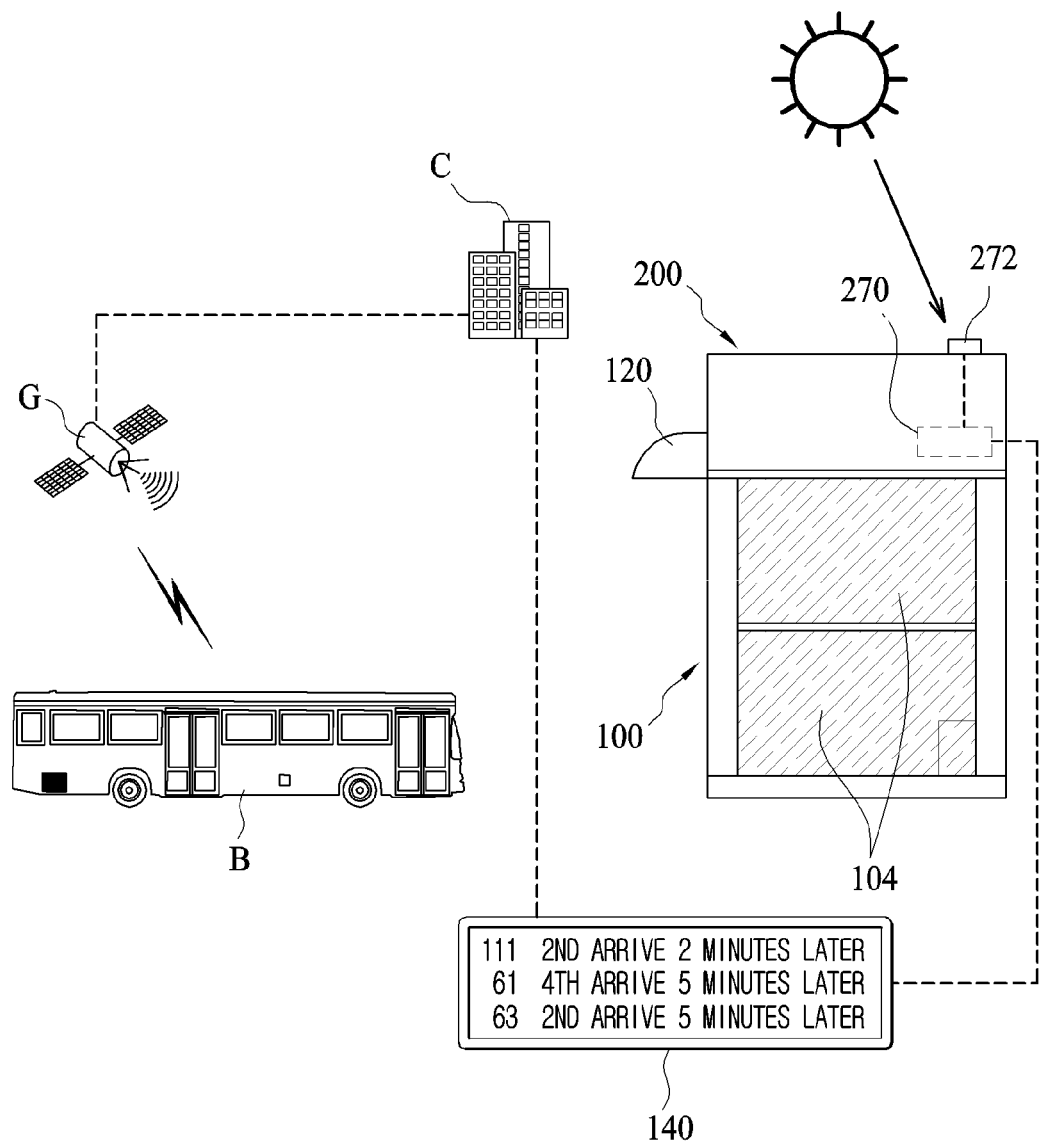
FIG. 11 is a view showing a window provided in a shelter housing and an operating process of a system interlocking therewith in a disaster safety smart shelter according to a third embodiment of the present invention.

FIG. 11 is a view showing a window 104 provided in a shelter housing 100 and an operating process of a system interlocking therewith in a disaster safety smart shelter according to a third embodiment of the present invention.

In the case of the third embodiment of the present invention illustrated in FIG. 11, the side wall part of the shelter housing 100 is formed to have an arbitrary area in the remaining region except for a region where the opening and shutting door 110 is located, and may include a window 104 formed to have transparency and a fixing frame 102 provided to fix the window.

In this case, according to the present embodiment, the window 104 is provided with a transparency control film so that the transparency of the window 104 may be adjusted.

For example, the transparency control film may have a material with silver nanowires coated on an elastic body having elasticity, and various transparency methods such as adjusting the transparency of the window 104 by adjusting the amount of current flowing through the transparency control film may be applied.

In addition, in the present embodiment, the ceiling part 200 of the shelter housing 100 may further include a solar altitude detection module 272 that detects the altitude of the sun and a transparency control module 270 that controls the transparency of the window 104. Accordingly, the transparency control module 270 may adjust the amount of current flowing through the transparency control film to correspond to the altitude of the sun detected by the sun altitude detection module 272 to adjust the transparency of the window 104, thereby adjusting the amount of sunlight shielded over time.

In addition, the transparency control module 270 may also interlock with the information guidance terminal module 140.

For example, a control center C may obtain location information received from an artificial satellite G through a GPS module mounted on public transportation such as a bus B, and the control center C may transmit such information as the above information guidance terminal module 140 to be displayed.

Here, the transparency control module 270 may interlock with the information guidance terminal module 140 to increase the transparency of the window 104 while an arbitrary bus B enters, and may enable a user located in the waiting space S to temporarily check the state in which the bus B arrives.

FIG. 12 is a diagram showing the overall appearance of a disaster safety smart shelter according to a fourth embodiment of the present invention.

Like the disaster safety smart shelter shown in the first embodiment described above, the disaster safety smart shelter of the fourth embodiment of the present invention shown in FIG. 12 includes a shelter housing 1000 having a waiting space S formed therein, which a user enters and waits in.

The first and fourth embodiments are the same in that the shelter housing 1000 includes a plurality of side wall parts, a ceiling part 1200 shielding upper portions of the plurality of side wall parts, and the waiting space S formed therein by the side wall parts and the ceiling part 200.

However, the disaster safety smart shelter of the present embodiment is formed to be wider than the first embodiment as a whole, and has a form in which a plurality of opening and shutting doors 1110a to 1110f are formed in one shelter housing 1000.

In the present embodiment, the total width of the shelter housing 1000 is about 36 m, and a total of six opening and shutting doors 1110a to 1110f are formed. However, it goes without saying that the width of the shelter housing 1000 and the number of the opening and shutting doors 1110a to 1110f may be variously formed.

In addition, since the detailed components provided on the side wall part and the ceiling part 1200 of the shelter housing 1000 may be applied in the same manner as in the first embodiment described above, detailed descriptions of overlapping components will be omitted.

Meanwhile, according to the form of the present embodiment, when using the disaster safety smart shelter as a waiting station for a public transportation stop such as a bus, a plurality of opening and shutting doors 1110a to 1110f may be controlled by IoT to be automatically opened and closed to correspond to the number and interval of buses arriving at the corresponding stop.

FIG. 13 is a diagram showing a connection pattern of a stop for applying an operating algorithm in a state in which the disaster safety smart shelter according to the fourth embodiment of the present invention is installed at a public transportation stop.

As shown in FIG. 13, first, the number of stops prior to one stop is determined based on a stop P0 where the disaster safety smart shelter of the present invention is installed.

For example, in the case of the road type as shown in FIG. 13A, there are a total of three stops P1 to P3 one stop before the stop P0 where the disaster safety smart shelter of the present invention is installed, and in the case of the road type as shown in FIG. 13B, there are a total of two stops P1 and P2 one stop before the stop P0 where the disaster safety smart shelter of the present invention is installed.

In this way, after determining whether there are one or more bus stops before one stop, it is determined whether there are one or more buses that will depart from each stop and arrive soon. Accordingly, the arrival order of buses to arrive is reviewed, and among the plurality of doors 1110a to 1110f, the door 1110a to 1110f where each bus stops is assigned.

Thereafter, it is checked whether the bus has arrived at the locations corresponding to each opening and shutting door 1110a to 1110f, and if it is determined that the bus has arrived, the corresponding opening and shutting doors 1110a to 1110f are opened to allow passengers inside the disaster safety smart shelter to board.

Figure 14:
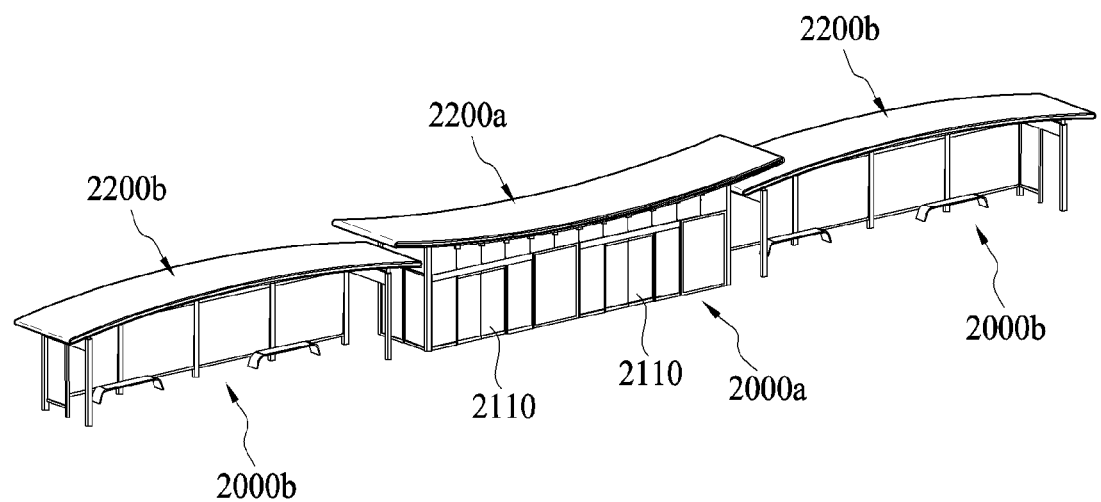
FIG. 14 is a diagram showing the overall appearance of a disaster safety smart shelter according to a fifth embodiment of the present invention.

FIG. 14 is a diagram showing the overall appearance of a disaster safety smart shelter according to a fifth embodiment of the present invention.

The disaster safety smart shelter of the fifth embodiment of the present invention shown in FIG. 14 has a shape surrounded by side walls, and has a first waiting space formed therein, which a user enters and waits in, a first shelter housing 2000a in which an opening and shutting door 2110 is formed, and a second shelter housing 2000b in which a second waiting space having a form in which a portion of front and side parts is opened is formed.

That is, the disaster safety smart shelter of the present embodiment has a form in which a plurality of shelter housings 2000a and 2000b are continuously arranged, and in particular, a pair of second shelter housings 2000b centered on the first shelter housing 2000a is each provided on both sides.

The first shelter housing 2000a includes a first ceiling part 2200a, and the second shelter housing 2000b includes a second ceiling part 2200b. In the present embodiment, the first ceiling part 2200a and the second ceiling part 2200b are formed in a curved shape as a whole to create an aesthetic sense.

In addition, as described above, since all side wall parts of the first shelter housing 2000a are shielded, when the outside air quality or weather deteriorates or the temperature is high or low, users may enter the first waiting space to wait.

In addition, since the second shelter housing 2000b has the form in which a portion of the front and side part is opened, when the outside air quality or weather is good and the temperature is comfortable, users can feel the external environment while waiting in the second waiting space.

As described above, the preferred embodiments according to the present invention have been reviewed, and the fact that the present invention can be embodied in other specific forms without departing from the spirit or scope in addition to the above-described embodiments is obvious to those skilled in the art. Therefore, the embodiments described above are to be regarded as illustrative rather than restrictive, and thus the present invention is not limited to the above description, but may be modified within the scope of the appended claims and their equivalents.

The invention claimed is:

1. A disaster safety smart shelter installed outdoors, comprising:
   a shelter housing including a plurality of side wall parts that includes a window formed to have transparency, a bottom part, and a ceiling part shielding upper portions of the plurality of side wall parts, a waiting space formed therein, which a user enters and waits in, and an opening and shutting door which is formed through at least a portion of the side wall parts to allow access to the waiting space;
   a ventilation module including an air discharge port provided through the ceiling part to discharge air inside the waiting space to the outside and an air suction port for supplying air from the outside to the waiting space;
   an information guidance terminal module provided to be exposed to the inside of the waiting space and displaying a plurality of pieces of information to a user;
   a power supply module provided on the ceiling part to supply power to each part;
   a cooling and heating module provided on the ceiling part to supply cool air or warm air to the waiting space, and including an outdoor unit and an outdoor unit case surrounding the outdoor unit;

a plurality of side walk blocks for a blind person including a block part that is buried in the bottom part and a plurality of protruding guide parts that protrude upward from the block part and perform guidance through tactile sense to the blind person, and configured to move the protruding guide part in a vertical direction to adjust a height from an upper surface of the block part and form a preset guide path from the opening and shutting door to the inside of the waiting space;

a detection module detecting a sensed means possessed by the blind person;

a solar altitude detection module provided on the ceiling part to detect the altitude of the sun;

a transparency control film provided in the window and configured to adjust transparency of the window according to an amount of current flowing;

a transparency control module controlling the transparency of the window by adjusting the amount of current flowing through the transparency control film;

wherein the outdoor unit case includes a plurality of frame bars that form openings therebetween for air discharge, the frame bar being formed to a thickness so that an aperture ratio of the outdoor unit case is 80% or more, the sidewalk block for the blind person includes:

a driving motor provided inside the block part;

an up and down stroke unit having a preset area and performing up and down strokes inside the block part by the driving motor;

a height control module including a connecting part extending upward from the up and down stroke part and connecting each protruding guide part so that the protruding guide part moves up and down according to the up and down stroke of the up and down stroke part, whereby, when the protruding guide part is maximally downward by the height control module, a height of an upper surface of the protruding guide part matches the height of the upper surface of the block part to realize a flat upper surface, and when the protruding guide part move up by the height control module, the protruding guide part is formed to protrude upward from the block part to perform an original guide function for the blind person, the detection module is configured to detect a distance from the sensed means to specify a position of the blind person, and to drive only the height control module of the plurality of sidewalk blocks for the blind person adjacent to the position of the blind person upwardly, the transparency control module is configured to adjust the amount of current flowing through the transparency control film to correspond to an altitude of the sun detected by the sun altitude detection module to adjust the transparency of the window so as to control the amount of sunlight shielded over time, and the transparency control module is configured to interlock with the information guidance terminal module to control the transparency of the window conjunction with the information guidance terminal module, the transparency of the window to increase while an arbitrary bus enters so that a user located in the waiting space confirms the arrival of the bus.

2. The disaster safety smart shelter of claim 1, wherein the ventilation module further includes an air purifying device that is provided across an air discharge path connected from the waiting space to the air discharge port and an air suction path connected from the waiting space to the air suction to purify flowing air.

3. The disaster safety smart shelter of claim 1, further comprising:
a photovoltaic power generation module provided outside the ceiling part to generate power from sunlight.

4. The disaster safety smart shelter of claim 3, wherein the power supply module includes a power storage unit for storing power generated by the photovoltaic power generation module.

5. The disaster safety smart shelter of claim 1, further comprising:
a lighting module provided on the ceiling part and radiating light to the waiting space.

6. The disaster safety smart shelter of claim 5, further comprising:
a dimming module detecting illuminance of the waiting space to adjust the illuminance of the lighting module.

7. The disaster safety smart shelter of claim 1, further comprising:
a waiting seat provided in the waiting space and formed to allow the user to be seated and including a temperature control module formed to adjust a temperature of a seating surface on which a user's body is seated.

8. The disaster safety smart module of claim 1, wherein the side wall part of the shelter housing comprises:
a window configured to have an arbitrary area and to have transparency; and
a fixing frame provided to fix the window.

9. The disaster safety smart shelter of claim 8, wherein the window is provided with a thermal barrier film.

10. The disaster safety smart shelter of claim 8, wherein the window is provided with a UV shielding film.

11. The disaster safety smart shelter of claim 1, wherein a canopy is installed on the upper portion of the opening and shutting door to shield light or prevent rainwater.

12. The disaster safety smart shelter of claim 1, wherein the side wall part is provided with a logo attachment part attaching display information.

13. The disaster safety smart shelter of claim 1, further comprising:
a fine dust meter measuring the fine dust in the waiting space.

14. The disaster safety smart shelter of claim 1, further comprising:
a temperature detector detecting the temperature of the waiting space.

* * * * *